United States Patent
Campagna et al.

(10) Patent No.: US 11,788,349 B2
(45) Date of Patent: *Oct. 17, 2023

(54) BLDC MOTOR CONTROL SYSTEM AND METHOD FOR INCREMENTAL MOTORIZED WINDOW TREATMENT OPERATION

(71) Applicant: Crestron Electronics, Inc., Rockleigh, NJ (US)

(72) Inventors: Michael Campagna, Woodcliff Lake, NJ (US); Benjamin Slivka, Hillsdale, NJ (US); Luis J. Rivera, Dumont, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,233

(22) Filed: Dec. 22, 2022

(65) Prior Publication Data

US 2023/0121526 A1    Apr. 20, 2023

Related U.S. Application Data

(63) Continuation of application No. 16/730,004, filed on Dec. 30, 2019, now Pat. No. 11,560,753, which is a
(Continued)

(51) Int. Cl.
*H02P 23/12* (2006.01)
*E06B 9/72* (2006.01)
(Continued)

(52) U.S. Cl.
CPC .................. *E06B 9/72* (2013.01); *E06B 9/42* (2013.01); *H02K 7/108* (2013.01); *H02K 29/08* (2013.01);
(Continued)

(58) Field of Classification Search
CPC ..... H02P 6/21; E06B 9/42; E06B 9/72; E06B 2009/6845; E06B 2009/6827; H02K 7/108; H02K 29/08; H02K 2207/03
See application file for complete search history.

(56) References Cited

U.S. PATENT DOCUMENTS 5,495,918 A * 3/1996 Peruggi .................. B66B 13/143
                                                        318/807
5,498,947 A * 3/1996 Wang .................... H02M 7/529
                                                        318/807

(Continued)

*Primary Examiner* — Kawing Chan
*Assistant Examiner* — Gabriel Agared
(74) *Attorney, Agent, or Firm* — CRESTRON ELECTRONICS, INC.

(57) ABSTRACT

A motorized shade comprising a motor adapted to lower or raise a shade material for selectively covering an architectural opening based on a position of the sun. The motorized shade comprises a controller adapted to drive the motor phase according to a startup sequence by ramping up amplitude form an initial amplitude to a startup amplitude and ramping up frequency from an initial frequency to a drive frequency, drive the motor phase according to a full drive sequence to move the shade material by driving the motor phase according to a sinusoidal waveform at a set maximum amplitude and at a drive frequency, and drive the motor phase according to a wind down sequence by reducing frequency from the drive frequency to an end frequency and reducing the amplitude from the maximum amplitude to an end amplitude.

21 Claims, 6 Drawing Sheets

Related U.S. Application Data continuation-in-part of application No. 15/800,771, filed on Nov. 1, 2017, now Pat. No. 10,530,279, which is a continuation of application No. 15/800,675, filed on Nov. 1, 2017, now Pat. No. 10,511,239.

(51) Int. Cl.
| | | |
|---|---|---|
| *E06B 9/42* | (2006.01) | |
| *H02P 6/21* | (2016.01) | |
| *H02K 29/08* | (2006.01) | |
| *H02K 7/108* | (2006.01) | |
| *E06B 9/68* | (2006.01) | |

(52) U.S. Cl.
CPC ........ *H02P 6/21* (2016.02); *E06B 2009/6827* (2013.01); *H02K 2207/03* (2013.01)

(56) References Cited

U.S. PATENT DOCUMENTS

| | | | | |
|---|---|---|---|---|
| 5,503,248 | A * | 4/1996 | Peruggi | E05F 15/60 318/808 |
| 8,339,086 | B2 * | 12/2012 | Feldstein | E06B 9/42 318/470 |
| 8,350,513 | B2 * | 1/2013 | Feldstein | E06B 9/42 318/266 |
| 11,560,753 | B2 * | 1/2023 | Campagna | H02P 6/21 |
| 2018/0048251 | A1 * | 2/2018 | Leman | H02P 6/17 |

\* cited by examiner

BLDC MOTOR CONTROL SYSTEM AND METHOD FOR INCREMENTAL MOTORIZED WINDOW TREATMENT OPERATION

BACKGROUND OF THE INVENTION

Technical Field

Aspects of the embodiments generally relate to a solar tracking operation in a motorized window treatment, and more specifically to systems, methods, and modes for controlling a brushless direct current (BLDC) driven motor during a solar tracking operation.

Background Art

Motorized window treatments provide a convenient one-touch control solution for screening windows, doors, or the like, to achieve privacy and thermal effects. Various types of motorized window treatments exist, including motorized roller shades, inverted rollers, Roman shades, Austrian shades, pleated shades, blinds, shutters, skylight shades, garage doors, or the like. A typical motorized window treatment includes a shade material that is manipulated by the motor to cover or uncover the window.

Such motorized applications require high performance motors capable of being driven with the least amount of audible noise possible, while maintaining stable velocity, position control, and energy efficiency. Generally, two types of motor controls are utilized, including linear and nonlinear. In linear control, the controller directly controls the motor via a control signal. Linear control methods may employ some type of linear mathematical compensator that is fine-tuned with the internal parameters of the system being controlled. A linear system operates without any awareness of extraneous factors. Nonlinear control systems modify the output by changes in the input using feedback.

For example, referring to FIG. 2, there is shown a simplified depiction of a brushless direct current (BLDC) motor 101. A BLDC motor 101 comprises a rotor 202 having a drive shaft 203 and a permanent magnet 204 divided into one to eight or more north (N)-south (S) pole pairs. A stator 207 is positioned about the rotor 202 that generally comprises a plurality of steel laminations that carry phase windings 205a-c defining the stator pole pairs. The BLDC motor 101 operates via electrical commutation generated by a motor controller. Commutation is the process of switching current in the phases in order to generate motion. Current is run through the phase windings 205a-c in alternating directions in a sequence such that the permanent magnet poles follow the revolving magnetic field that is caused by the windings.

To determine the timing of the current running through the phase windings 205a-c, Hall Effect sensors 206a-c are generally placed around the rotor 202 for each phase control to track the position of the rotor 202 and provide feedback to the motor controller. Speed of the rotor 202 is determined by the time interval between signals from the Hall Effect sensors 206a-c. One control scheme for electronic commutation involves sinusoidal commutation. Typically, the motor controller outputs three sinusoidal waveforms at 120 degrees out of phase across the three phases of the motor 101, as shown in FIG. 3. The phase angle of these sinusoidal waveforms depends on the position of the rotor 202 as reported by the Hall Effect sensors feedback. To maintain constant output speed, as more load is exerted on the motor 101, the motor controller may change the frequency, amplitude, and/or phase of the sinusoidal waveform, and thereby change the speed of the motor 101, based on speed errors reported by the Hall Effect sensors 206a-c.

Generally, during normal operation of a motorized window treatment, for example to open or close a window, nonlinear control systems using feedback are effective in providing efficient motor control. However, there are times when the motor only needs to be operated for a very short period of time, not long enough to receive and process any feedback. For example, in a solar tracking operation, a motorized window treatment may be automatically raised or lowered to open or close a window based on the location of the sun. In such an implementation, because the sun moves very slowly, it is desired that the motorized window treatment operates unperceivably, and as such very quietly, slowly, and in short increments.

Accordingly, a need has arisen for systems, methods, and modes for controlling a brushless direct current (BLDC) driven motor for a solar tracking operation in a motorized window treatment.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for controlling a brushless direct current (BLDC) driven motor for a solar tracking operation in a motorized window treatment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a motorized shade is provided for selectively covering an architectural opening based on a position of the sun. The motorized shade comprises a roller tube, a shade material comprising and extending between a first end connected to the roller tube and a second end, and a motor drive unit operably connected to the roller tube. The motor drive unit comprises a motor adapted to rotate the roller tube to raise or lower the shade material between an upper limit and a lower limit, wherein the motor comprises a rotor and a stator comprising at least one phase. The motor drive unit further comprises a controller for controlling the motor, wherein for at least one motor phase the controller is adapted to: receive a control command to move the motor, wherein the control command is generated in response to a solar tracking algorithm; drive the motor phase according to an amplitude ramping curve comprising amplitude that increases from an initial amplitude to a startup amplitude; drive the motor phase according to a sinusoidal waveform at a set maximum amplitude and at an initial frequency; ramp up frequency of the sinusoidal waveform from the initial frequency to the drive frequency; and drive the motor phase according to the sinusoidal waveform at the set maximum amplitude and the drive frequency to move the shade material.

According to an embodiment, the control command may be generated by the controller that implements the solar tracking algorithm, by an external control processor that implements the solar tracking algorithm, or the like, or any combinations thereof. According to an embodiment, the solar tracking algorithm is adapted to determine the position of the sun based at least one selected from the group consisting of a location, a time of day, a time of year, a direction of the architectural opening, an elevation of the architectural opening from a floor, an elevation of the architectural opening from sea level, a light sensor, and any combinations thereof.

According to an embodiment, the received control command comprises a drive distance, wherein the controller drives the motor phase according to the sinusoidal waveform at the set maximum amplitude and the drive frequency to move the shade material by the drive distance. The received control command may also comprise a drive speed, wherein the controller determines the drive frequency based on the drive speed. The at least one of the drive distance and the drive speed may be determined based on at least one parameter of the motorized shade or the architectural opening, such as a size of architectural opening, an elevation of the architectural opening from a floor, an elevation of the architectural opening from sea level, a size of the shade material, a weight of the shade material, a determined angle of the architectural opening with respect to the sun, a distance of how far light should enter a space, a position of the shade material between the upper and the lower limit, or the like, and any combinations thereof.

According to an embodiment, for each motor phase the controller may be adapted to determine the startup amplitude based on prior recorded position of the rotor with respect to the stator. According to an embodiment, the motor drive unit may further comprise at least one position detector adapted to detect the position of the rotor with respect to the stator. According to an embodiment, the amplitude ramping curve comprises at least one selected from the group consisting of a linear curve, a non-linear curve, a positive logarithmic curve, a negative logarithmic curve, and any combinations thereof. The at least one of the initial amplitude and the initial frequency may comprise zero, a nominal value, or any combination thereof. According to an embodiment, the controller ramps up the frequency of the sinusoidal waveform according to a frequency ramping curve. The frequency ramping curve may comprise at least one selected from the group consisting of a linear curve, a non-linear curve, a positive logarithmic curve, a negative logarithmic curve, and any combinations thereof.

According to an embodiment, after driving the motor phase to move the shade material, the controller may be further adapted to: reduce the frequency of the sinusoidal waveform from the drive frequency to an end frequency; and drive the motor phase according to an amplitude relaxing curve comprising amplitude that decreases from a wind down amplitude to an end amplitude. For each motor phase the controller may be adapted to determine the wind down amplitude based on a then determined current position of the rotor with respect to the stator. The motor drive unit may further comprise at least one position detector adapted to detect the position of the rotor with respect to the stator. The amplitude relaxing curve may comprise at least one selected from the group consisting of a linear curve, a non-linear curve, a positive logarithmic curve, a negative logarithmic curve, and any combinations thereof. The at least one of the end amplitude and the end frequency may comprise zero. The controller may reduce the frequency of the sinusoidal waveform according to a frequency wind down curve. The frequency wind down curve may comprise at least one selected from the group consisting of a linear curve, a non-linear curve, a positive logarithmic curve, a negative logarithmic curve, and any combinations thereof.

According to an embodiment, the controller is further adapted to determine the startup amplitude based on a previously converged to amplitude of the motor phase. The amplitude ramping curve may comprise a function of increasing voltage from the initial amplitude to the startup amplitude during a predetermined time period. According to an embodiment, the motor may comprise a plurality of phases, wherein the startup amplitude for each phase is different, and wherein the controller is adapted to determine the amplitude ramping curve for each phase such that the plurality of phases arrive at their respective startup amplitudes at the same time.

According to an embodiment, the set maximum amplitude may be determined based on at least one parameter of the motor, a maximum level of torque anticipated to be driven by the motor, or a load parameter on the motor of the motorized shade, or the like, and any combinations thereof. The load parameter may comprise a size of the shade material, a weight of the shade material, a size of a hem bar attached to the shade material, a weight of the hem bar, or the like, and any combinations thereof.

According to another aspect of the embodiments, a motorized shade is provided for selectively covering an architectural opening based on a position of the sun. The motorized shade comprises a roller tube, a shade material comprising and extending between a first end connected to the roller tube and a second end, and a motor drive unit operably connected to the roller tube. The motor drive unit comprises a motor adapted to rotate the roller tube to raise or lower the shade material between an upper limit and a lower limit, wherein the motor comprises a rotor and a stator comprising at least one phase. The motor drive unit further comprises a controller for controlling the motor, wherein for at least one motor phase the controller is adapted to: receive a control command to move the motor, wherein the control command is generated in response to a solar tracking algorithm, wherein the control command comprises a drive distance that is determined via the solar tracking algorithm based on at least one parameter of the motorized shade or the architectural opening; drive the motor phase according to a startup sequence during a first time period, wherein the startup sequence comprises ramping up amplitude form an initial amplitude to a startup amplitude and ramping up frequency from an initial frequency to a drive frequency; drive the motor phase according to a full drive sequence during a second time period to move the shade material by the drive distance, wherein the full drive sequence comprises driving the motor phase according to a sinusoidal waveform at a set maximum amplitude and at the drive frequency; and drive the motor phase according to a wind down sequence during a third time period, wherein the wind down sequence comprises reducing frequency from the drive frequency to an end frequency and reducing the amplitude from the maximum amplitude to an end amplitude.

According to another aspect of the embodiments, a method is provided for controlling a motor of a motorized shade for selectively covering an architectural opening based on a position of the sun. The motorized shade comprises a roller tube, a shade material comprising and extending between a first end connected to the roller tube and a second end, and a motor drive unit operably connected to the roller tube and comprising the motor adapted to rotate the roller tube to raise or lower the shade material between an upper limit and a lower limit, wherein the motor comprises a rotor and a stator comprising at least one phase. Wherein for at least one motor phase the method comprises the steps of: receiving a control command to move the motor, wherein the control command is generated in response to a solar tracking algorithm; driving the motor phase according to an amplitude ramping curve comprising amplitude that increases from an initial amplitude to a startup amplitude; driving the motor phase according to a sinusoidal waveform at a set maximum amplitude and at an initial frequency; ramping up frequency of the sinusoidal waveform from the initial frequency to the drive frequency; driving the motor phase according to the sinusoidal waveform at the set maximum amplitude and the drive frequency to move the shade material; reducing the frequency of the sinusoidal waveform from the drive frequency to an end frequency; and driving the motor phase according to an amplitude relaxing curve comprising amplitude that decreases from a wind down amplitude to an end amplitude

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
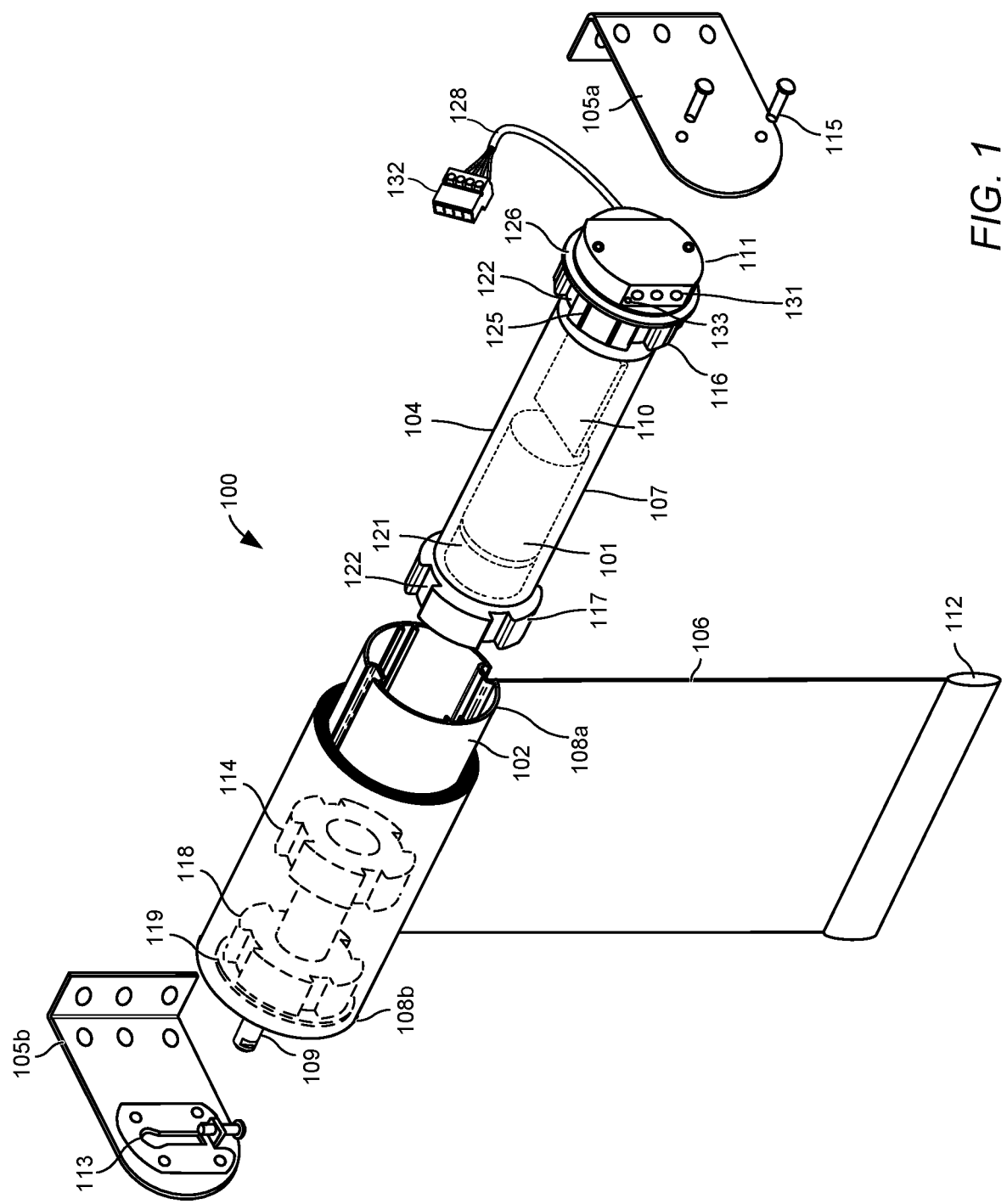

FIG. 1 illustrates a front perspective view of a roller shade according to an illustrative embodiment.

Figure 2:
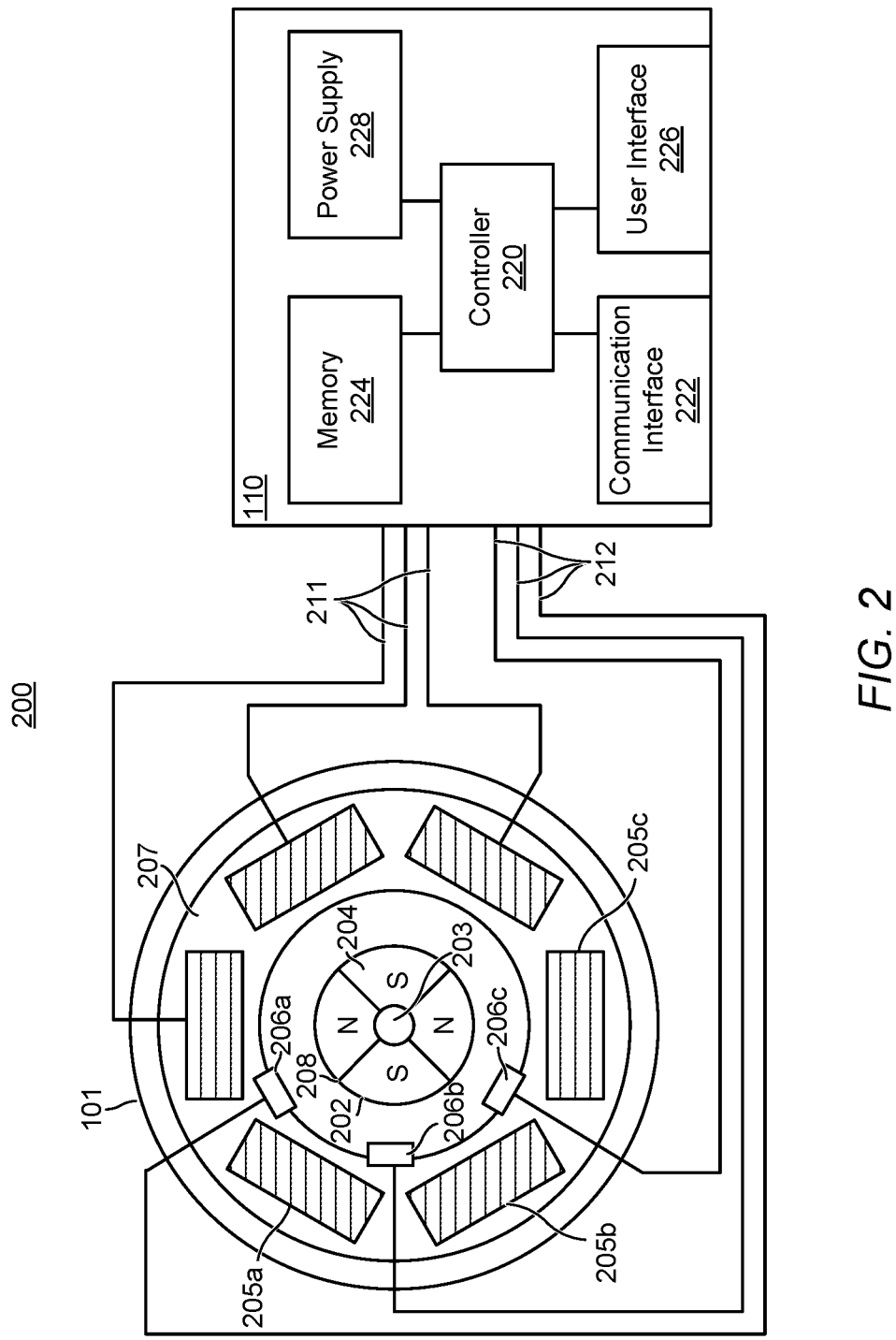

FIG. 2 illustrates a block diagram of the motor drive unit of the roller shade according to an illustrative embodiment.

Figure 3:
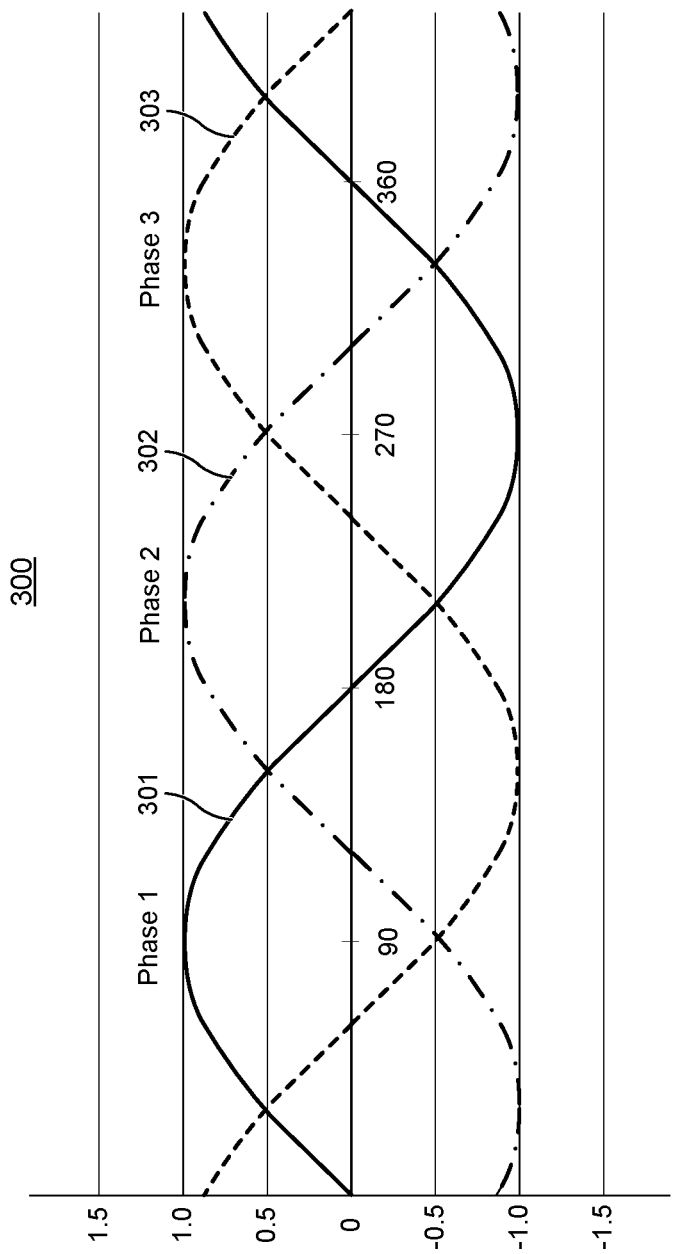

FIG. 3 illustrates a three phase sinusoidal waveform of a motor control signal during normal operation according to an illustrative embodiment.

Figure 4:
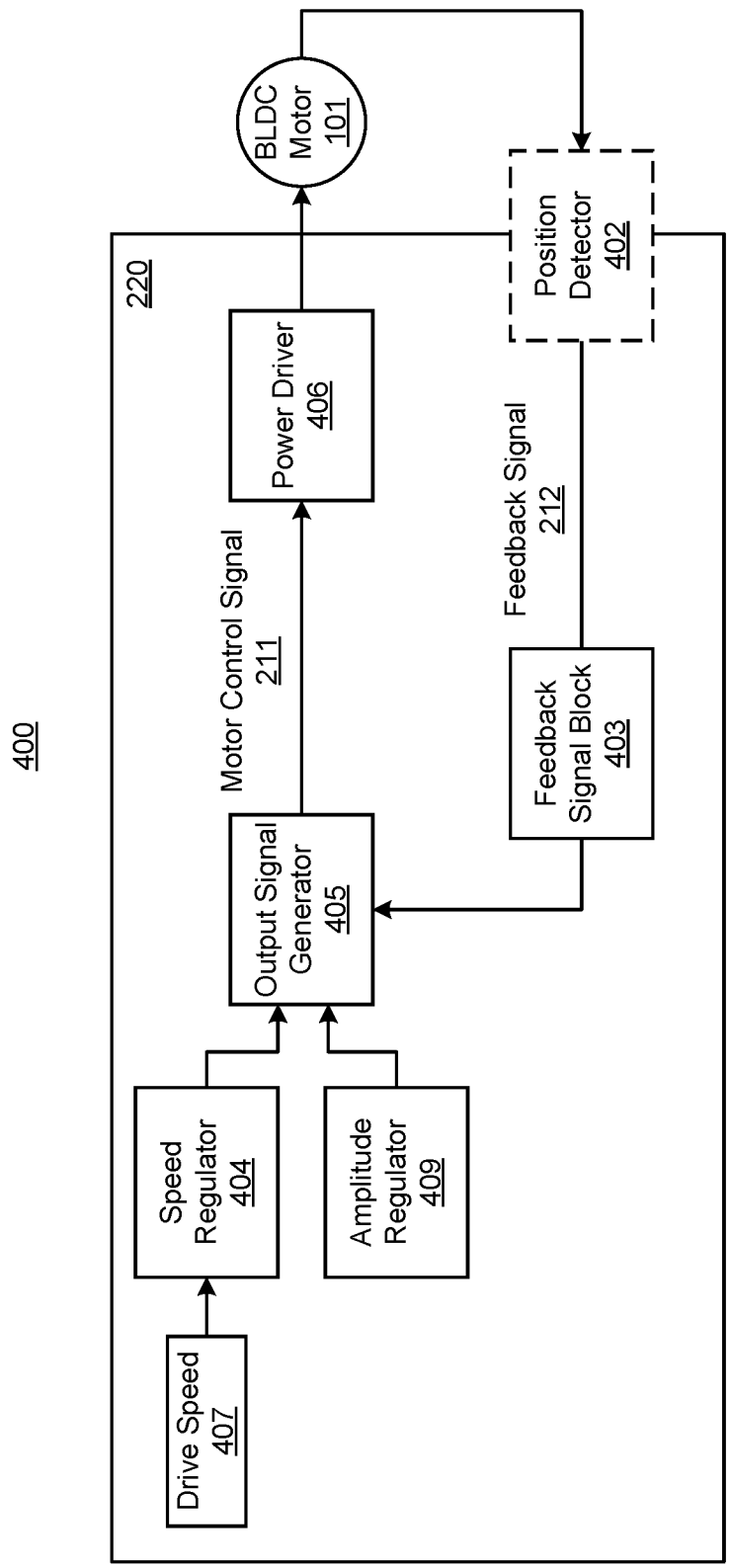

FIG. 4 illustrates a block diagram of the motor control system in greater detail according to an illustrative embodiment.

Figure 5:
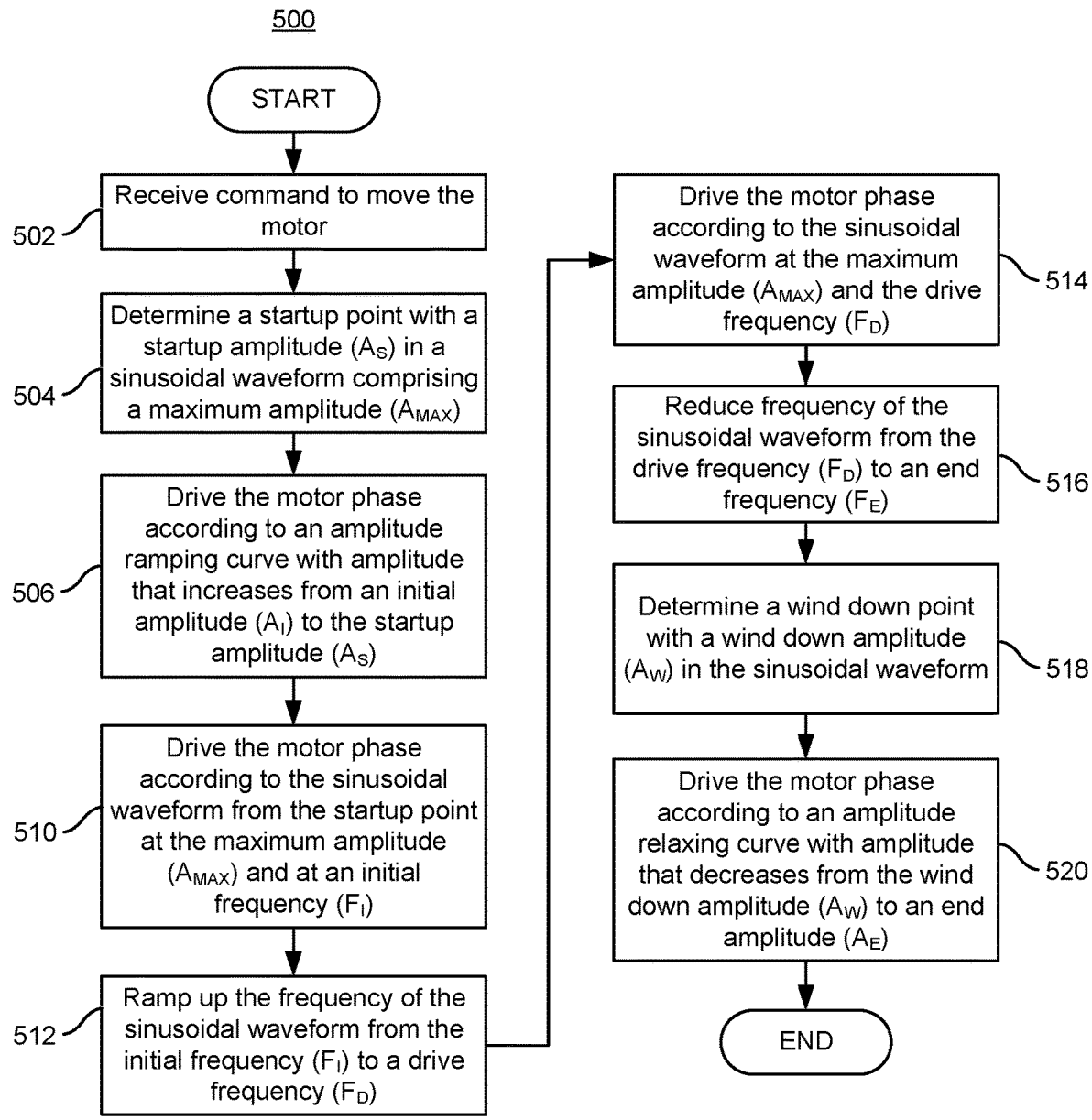

FIG. 5 shows a flowchart that illustrates a method of controlling the motor system for a solar tracking operation according to an illustrative embodiment.

Figure 6A:
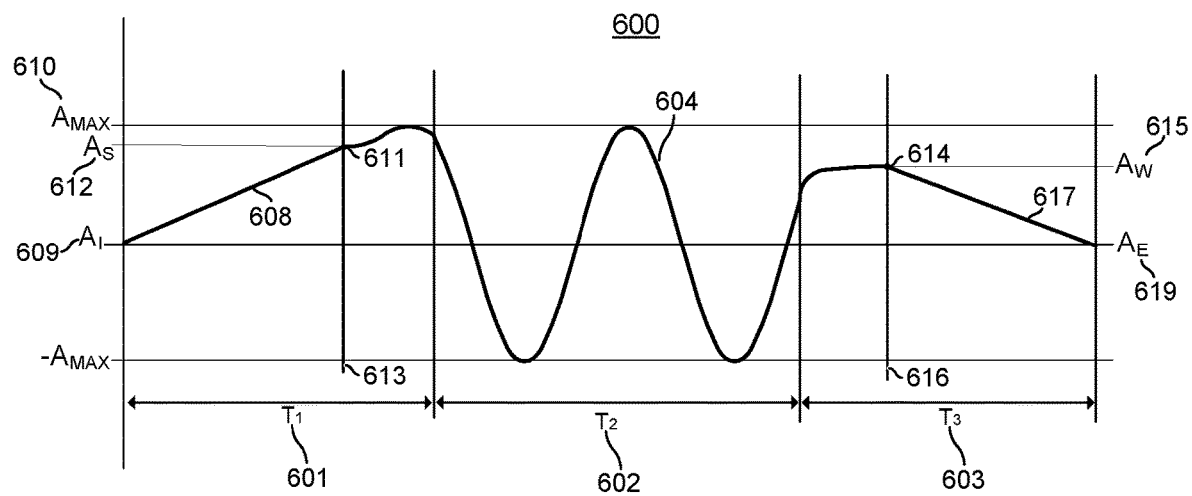

FIG. 6A illustrates an exemplary motor control signal generated for one of the phases of the motor according to the method in FIG. 5.

Figure 6B:
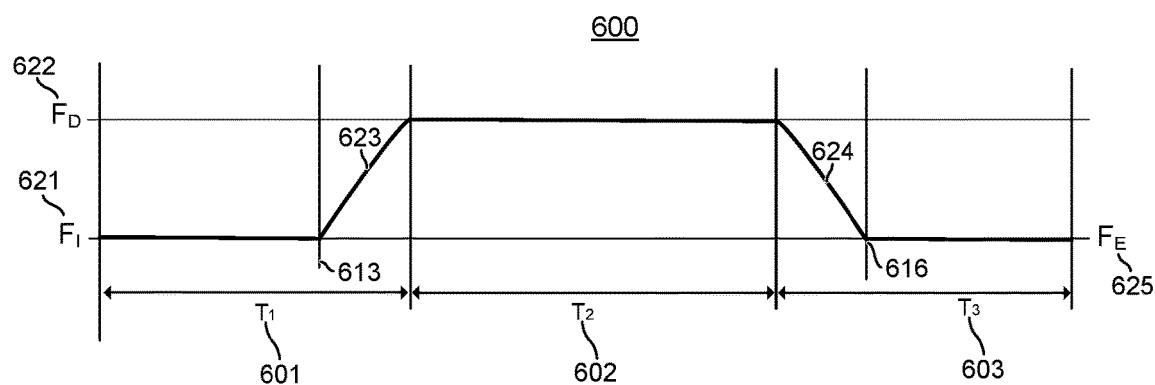

FIG. 6B illustrates the changes in frequency of the motor control signal generated for one of the phases of the motor according to the method in FIG. 5.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Roller Shade
101 Motor
102 Roller Tube
104 Motor drive Unit
105a Mounting Bracket
105b Mounting Bracket
106 Shade Material
107 Motor Housing
108a First End
108b Second End
109 Idler Pin
110 Motor Control Module
111 Motor Head
112 Hem Bar
113 Keyhole
114 Idler Assembly
115 Screws
116 Crown Adapter Wheel
117 Drive Wheel
118 Idler Body
119 Flange
121 Clutch
122 Channels
125 Teeth
126 Flange
128 Power Cord
131 Three-Button Interface
132 Terminal Block
133 Light Indicator
200 Block Diagram 202 Rotor
203 Drive Shaft
204 Permanent Magnet
205a-c Phase Windings
206a-c Hall Effect Sensors
207 Stator
208 Crossing Point
211 Motor Control Signal
212 Feedback Signal
220 Controller
222 Communication Interface
224 Memory
226 User Interface
228 Power Supply
300 Three Phase Sinusoidal Waveform
301 First Phase Sinusoidal Wave
302 Second Phase Sinusoidal Wave
303 Third Phase Sinusoidal Wave
400 Motor System
402 Position Detector
403 Feedback Signal Block
404 Speed Regulator
405 Output Signal Generator
406 Power Driver
407 Reference Speed
409 Amplitude Regulator
500 Flowchart that Illustrates a Method of Controlling the Motor System for a Solar Tracking Operation
502-520 Steps of Flowchart 500
600 Motor Control Signal
601 First Time Period ($T_1$)
602 Second Time Period ($T_2$)
603 Third Time Period ($T_3$)
604 Sinusoidal Waveform
608 Amplitude Ramping Curve
609 Initial Amplitude ($A_I$)
610 Maximum Amplitude ($A_{MAX}$)
611 Startup Point
612 Startup Amplitude ($A_S$)
613 Startup Time
614 Wind Down Point
615 Wind Down Amplitude ($A_W$)
616 Wind Down Dime
617 Amplitude Relaxing Curve
619 End Amplitude ($A_E$)
621 Initial Frequency ($F_I$)
622 Drive Frequency ($F_D$)
623 Frequency Ramping Curve
624 Frequency Wind Down Curve
625 End Frequency ($F_E$)

LIST OF ACRONYMS USED IN THE SPECIFICATION IN ALPHABETICAL ORDER

The following is a list of the acronyms used in the specification in alphabetical order.
$A_I$ Initial Amplitude
$A_E$ End Amplitude
$A_S$ Startup Amplitude
$A_{MAX}$ Maximum Amplitude
$A_W$ Wind Down Amplitude
AC Alternating Current
ASIC Application Specific Integrated Circuit
BLDC Brushless Direct Current
CAT5 Category 5 Cable
DC Direct Current
EMF Electromotive Force
EEPROM Electrically Erasable Programmable Read-Only Memory
$F_D$ Drive Frequency
$F_E$ End Frequency
$F_I$ Initial Frequency
IR Infrared
LAN Local Area Network
LED Light Emitting Diode
N North
PCB Printed Circuit Board
PoE Power over Ethernet
PWM Pulse Width Modulation
RAM Random-Access Memory
RF Radio Frequency
ROM Read-Only Memory
RPM Revolutions per Minute
S South
$T_1$ First Time Period
$T_2$ Second Time Period
$T_3$ Third Time Period
VFD Variable-Frequency Drive

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, NJ.

The different aspects of the embodiments described herein pertain to the context of systems, methods, and modes for controlling a brushless direct current (BLDC) driven motor for a solar tracking operation in a motorized window treatment. While the embodiments described herein are explained by referencing roller shade comprising a Brushless Direct Current (BLDC) motor, it should be noted that the motor control algorithms discussed herein may be applied to any type of sinusoidally driven motors, including but not limited to brushed direct current (DC) motors, outrunner BLDC motors, alternating current (AC) motors, variable-frequency driven (VFD) motors, or the like. In addition, while a three-phased motor is illustrated and described herein, the motor control algorithms discussed herein may be applied to a motor with any number of one or more phases. Accordingly, the motor control signal illustrated and discussed herein may comprise one or more sinusoidal waves corresponding to the number of phases of the motor. In addition, while the motor control methods described below are with reference to roller shades, the motor control algorithms discussed herein may be used for other applications, including for other types of motorized window treatments (such as inverted rollers, Roman shades, Austrian shades, pleated shades, blinds, shutters, skylight shades, garage doors, or the like), or any other type of motorized systems. The motorized shade described herein may be used for covering any type of architectural opening, such as windows, doors, wall openings, or the like.

Referring to FIG. 1, there is shown a front perspective view of a roller shade 100 according to one aspect of the embodiments. Roller shade 100 generally comprises a roller tube 102, a motor drive unit 104, an idler assembly 114, shade material 106, and a hem bar 112. Shade material 106 is connected at its top end to the roller tube 102 and at its bottom end to the hem bar 112. Hem bar 112 can comprise a weighted bar that runs longitudinally and laterally across the width of the shade material 106 to minimizes any movement in the field and properly tensions the shade material 106 to allow for a straight hang of the shade material 106. Shade material 106 wraps around the roller tube 102 and is unraveled from the roller tube 102 to cover a window, a door, a wall opening, or the like.

Roller tube 102 is generally cylindrical in shape and longitudinally and laterally extends from a first end 108a to a second end 108b. In various embodiments, the roller tube 102 may comprise aluminum, stainless steel, or the like. The first end 108a of the roller tube 102 receives the motor drive unit 104 and the second end 108b of the roller tube 102 receives the idler assembly 114.

The idler assembly 114 of the roller shade 100 may comprise an idler pin 109 and an idler body 118 rotatably connected about the idler pin 109. The idler body 118 is inserted into and operably connected to the roller tube 102 such that rotation of the roller tube 102 also rotates the idler body 118. The idler body 118 may comprise a flange 119 to prevent the idler body 118 from sliding entirely into the roller tube 102. The idler body 118 may comprise ball bearings therein (not shown) allowing the idler body 118, and thereby the roller tube 102, to rotate with respect to the idler pin 109.

The motor drive unit 104 may comprise a motor head 111, a crown adapter wheel 116, a motor housing 107 containing a motor control module 110 and a motor 101 therein, and a drive wheel 117. The motor drive unit 104 may be inserted into first end 108a of the roller tube 102. The crown adapter wheel 116 and the drive wheel 117 are generally cylindrical in shape and are inserted into and operably connected to roller tube 102 through its first end 108a. Crown adapter wheel 116 and drive wheel 117 may comprise a plurality of channels 122 extending circumferentially about their external surfaces that mate with complementary projections radially extending from the inner surface of the roller tube 102 to lock their respective rotation. Crown adapter wheel 116 can further comprise a plurality of teeth 125 extending circumferentially about its external surface to form a friction fit between the crown adapter wheel 116 and the inner surface of the roller tube 102. The crown adapter wheel 116 may be rotatably attached to a first end of the motor housing 107 via a ball bearing therein (not shown). Crown adapter wheel 116 can further comprise a flange 126 radially extending therefrom to prevent it from sliding entirely into the roller tube 102 and such that the motor head 111 remains at least partially exterior to the roller tube 102. The drive wheel 117 is operably connected, either directly or indirectly, such as through a clutch 121 and/or one or more states of gears, such as planetary gears, to the drive shaft 203 (FIG. 2) of the motor 101, such that rotation of the motor drive shaft 203 also rotates the drive wheel 117.

During installation, the roller shade 100 is mounted on or in a window between the first and second mounting brackets 105a and 105b. The roller shade 100 may first be mounted to the second mounting bracket 105b by inserting the tip of the idler pin 109 into a keyhole 113 of the second mounting bracket 105b. The roller shade 100 may then be mounted to the first mounting bracket 105a by snapping the motor head 111 of the motor drive unit 104 to the first mounting bracket 105a or coupling the motor head 111 to the first mounting bracket 105a using screws 115. The mounting brackets 105a and 105b can comprise similar configuration to the CSS-DECOR3 QMT®3 Series Décor Shade Hardware, available from Crestron Electronics, Inc. of Rockleigh, N.J. Other types of brackets may be utilized without departing from the scope of the present embodiments.

In operation, the shade material 106 is rolled down and rolled up between an upper limit and a lower limit via the motor drive unit 104. Particularly, the motor 101 drives the drive wheel 117, which in turn engages and rotates the roller tube 102. The roller tube 102, in turn, engages and rotates the crown adapter wheel 116 with respect to the motor 101, while the motor housing 107, including the motor 101 and motor control module 110, remain stationary. As a result, the shade material 106 may be lowered from an upper limit where it is at an opened or rolled up position and substantially fully wrapped about the roller tube 102, to a lower limit where it is at a closed or rolled down position and substantially unraveled from the roller tube 102, and vice versa.

Referring to FIG. 2, there is shown an illustrative block diagram 200 of the motor drive unit 104 comprising a motor 101 and a motor control module 110 according to an illustrative embodiment. According to one embodiment, the motor 101 may comprise a BLDC motor, although other types of sinusoidally driven motors may be utilized. The motor 101 may comprise a rotor 202 and a stator 207. A rotor 202 of a BLDC type motor may comprise a drive shaft 203 and a permanent magnet 204 divided into one to eight, or more, north (N)-south (S) pole pairs. The stator 207 may be positioned about the rotor 202 and may comprise a plurality of steel laminations that carry phase windings 205a-c defining the stator pole pairs. The motor 101 operates via electrical commutation generated by control module 110. Particularly, the control module 110 outputs a motor control signal 211 that sequentially energies the coils in the phase windings 205a-c.

The motor drive unit 104 may further comprise at least one position detector adapted to detect or determine the position of the rotor 202 in relation to the stators 205a-c and provide a feedback signal 212 to the control module 110. For illustrative purposes, as shown in FIG. 2, three Hall Effect sensors 206a-c may be utilized, which may be arranged around the rotor 202 to detect the position of the rotor 202 with respect to the stators 205a-c and generate the feedback signal 212 over a plurality of Hall Effect sensor channels. However, other types of position detectors may be utilized to provide the feedback signal 212 without departing from the scope of the present embodiments. For example, the at least one position detector may comprise one or more of a position feedback sensor (such as a Hall Effect sensor, a magnetic position sensor, or the like), a resolver, an encoder (such as an optical encoder, a magnetic encoder, or the like), a current sense circuit, a voltage sense circuit, a back electromotive force (EMF) sense circuit, any combinations thereof, or any other similar position detector capable of determining the position of a rotor with respect of a stator in a motor.

The motor control module 110 operates to control the motor 101, directing the operation of the motor, including its direction, speed, and position. The motor control module 110 may comprise fully integrated electronics printed on a printed circuit board (PCB). The motor control module 110 can comprise a controller 220, memory 224, communication interface 210, user interface 131, and light indicator 133.

The controller 220 can represent one or more microprocessors, which can be "general purpose" microprocessors, special purpose microprocessors, a combination of general and special purpose microprocessors, application specific integrated circuits (ASICs), or any combinations thereof. The controller 220 can provide processing capability to provide processing for one or more of the techniques and functions described herein. The motor control module 110 can further include memory 224 communicably coupled to the controller 220. Memory 224 can store data and executable code, such as volatile memory, nonvolatile memory, read-only memory (ROM), random-access memory (RAM), electrically erasable programmable read-only memory (EEPROM), flash memory, a hard disk drive, or other types of memory.

The motor control module 110 may comprise a power supply 228 configured for providing power to the various components of the motor drive unit 104. The motor control module 110 may be connected to a voltage line for receiving an electric alternating current (AC) power signal from an AC mains power source. The power supply 228 may comprise circuit components configured for converting the incoming AC power signal to a direct current (DC) power signal. In another embodiment, the motor control module 110 may be connected to an external power supply for receiving a DC power signal. For example, power can be supplied to the motor control module 110 through a power cord 128 by connecting a terminal block 132 (FIG. 1) to a dedicated power supply, such as the CSA-PWS40 or CSA-PWS10S-HUBENET power supplies, available from Crestron Electronics, Inc. of Rockleigh, NJ. In another embodiment, the motor drive unit 104 may be battery operated and as such may be connected to an internal or external power supply 228 in a form of batteries. In yet another embodiment, the motor drive unit 104 may be powered via solar panels placed in proximity to the window to aggregate solar energy.

In an embodiment, the motor control module 110 may comprise a local user interface 226, such one or more buttons 131 disposed on the motor head 111 (FIG. 1), that allows users to control the motor by receiving control commands directly from a user and/or set up the motor drive unit 104, for example to set the shade upper and lower limits. The user interface 226 may further comprise one or more light indicators 133, such as a multicolor light emitting diode (LED) disposed on the motor head 111 (FIG. 1), to provide feedback to the status of the motor 101.

In another embodiment, the motor control module 110 further comprises a communication interface 222, such as a wired or a wireless interface, configured for receiving control commands from an external control point. The wireless interface may be configured for bidirectional wireless communication with other electronic devices, such as the external control point, over a wireless network. In various embodiments, the wireless interface 210 can comprise a radio frequency (RF) transceiver, an infrared (IR) transceiver, or other communication technologies known to those skilled in the art. A radio frequency (RF) transceiver may be configured for bidirectional wireless communication using wireless communication protocols, such as the ZigBee® protocol, the infiNET EX® protocol from Crestron Electronics, Inc. of Rockleigh, NJ, or the like. In yet another embodiment, wireless communication interface 210 may communicate via Bluetooth transmission. The wired interface may be configured for bidirectional communication with other devices over a wired network. The wired interface can represent, for example, an Ethernet or a Cresnet® port. Cresnet® provides a network wiring solution for Crestron® keypads, lighting controls, thermostats, and other devices. In various aspects of the embodiments, the communication interface 122 and/or power supply 128 can comprise a Power over Ethernet (PoE) interface. The motor control module 110 can receive both the electric power signal and the control input from a network through the PoE interface. For example, the PoE interface may be connected through category 5 cable (CAT5) to a local area network (LAN) which contains both a power supply and multiple control points and signal generators. Additionally, through the PoE interface, the controller 220 may interface with the internet and receive control inputs remotely, such as from a homeowner running an application on a smart phone.

The control commands received by the controller 220 may be a direct user input to the controller 220 from the user interface 226 or through a wired or wireless signal received by the communication interface 222 from an external control point. For example, the controller 220 may receive a control command from a wall-mounted button panel or a touch-panel in response to a button actuation or similar action by the user. Control commands may also originate from a signal generator such as a timer or external sensors, such as occupancy sensors. Accordingly, the controller 220 can integrate seamlessly with other control systems using the communication interface 210 to be operated from keypads, wireless remotes, touch screens, and wireless communication devices, such as smart phones. Additionally, the controller 220 can be integrated within a large scale building automation system or a small scale home automation system and be controllable by a central control processor, such as the PRO3 control processor available from Crestron Electronics, Inc., that networks, manages, and controls a building management system.

The controller 220 may output a motor control signal 211 to the motor 101 comprising at least one sinusoidal wave, each configured to energize a corresponding phase of the motor. For a three-phase motor, during a normal operation, the motor control signal 211 may comprise a three phase sinusoidal waveform 300 shown in FIG. 3 having three sinusoidal waves 301-303 across the three phases of the motor 101, which may be 120 degrees out of phase. However, the motor control signal 211 may comprise less or more sinusoidal waves to correspond to the number of phases included in the motor, and the sinusoidal waves may be offset by other number of degrees. The motor control signal 111 comprising sinusoidal waveform 300 may be synthesized by the controller 220 using pulse width modulation (PWM). The frequency of this waveform 300 may be determined by a linear relation that involves the desired speed of the motor 101 in revolutions per minute (RPM) as well as the given motor parameters. According to an embodiment, during normal operation of the roller shade 100, the controller 220 may alter the frequency and/or the amplitude of the motor control signal 221 to maintain or change the motor speed based on the feedback signal 212 the controller 220 receives from the position detector, such as Hall Effect sensors 206a-c, as there is enough feedback over time to converge the motor control algorithm. However, in a solar tracking application, it is desired to move the shade material 106 at an extremely low speed and only for a very short period of time. In such applications, the motor control signal 211 needs to be generated before any feedback signal 212 can be received and observed by the controller 220.

According to an embodiment, the roller shade 100 may be operated in a solar tracking application where the controller 220 automatically operates the motor 101 based on the location of the sun. Solar tracking is used to minimize the amount of artificial light that must be used to maximize daylighting, minimize the amount of air conditioning required in a space to minimize heat gain, minimize glare to maximize personal comfort of occupants, and to protect interior surfaces, furnishings, etc. from harmful UV rays. To implement solar tracking, the controller 220 may be adopted to determine the location of the sun via a variety of ways, such via a software run algorithm, one or more sensors, or a combination of the two. For example, the controller 220 may implement a software run algorithm that indicates to the controller 220 to move the shade material 106 based on where the sun is supposed to be—which may be determined based on location, time of day, time of year, window facing direction, an elevation of the architectural opening from a floor, an elevation of the architectural opening from sea level, and any combinations thereof, or the like. In another embodiment, the controller 220 may utilize a sensor, such as a daylight sensor, to determine whether there are clouds or obstacles blocking the sun. Although in another embodiment, the solar tracking algorithm may be implemented by a building automation system that operates one or a plurality of roller shades 100 based on the position of the sun.

Based on the sun's position, the controller 220 may generate a motor control signal 211 to move the shade material 106 by a certain drive distance to modulate the shade material height and control the light level entering the room. The drive distance may be a predefined distance stored in memory 224. For example, the controller 220 may be adopted to move the shade material 106 about a quarter of an inch every fifteen minutes. According to another embodiment, the drive distance may be determined by the controller 220 during initial set up or dynamically according to the solar tracking algorithm that takes into account various parameters of the roller shade system. In a roller shade solar tracking application, the rate of change where the shade material 106 needs to be in relation to where the sun varies between differently sized shades. Accordingly, the parameters of the roller shade system may include the size of the window, the elevation of the window from the floor or the sea level, the size of the shade material, the weight of the shade material, the angle of the window with respect to the sun, the point of how far the light should enter the space, the position of the shade material 106 between the upper and the lower limit as determined by position detector 402, or the like. One or more of these parameters may be determined by the controller 220 or inputted to the controller 220 and used by the controller 220 to determine the desired drive distance.

According to the present embodiments, the motor control signal 211 is synthesized from the motor controller 220 using PWM. FIG. 4 illustrates a block diagram 400 of the motor control system in greater detail according to an illustrative embodiment. According to an embodiment, the controller 220 may comprise a speed regulator 404 that sets the speed of the motor 101 according to a drive speed 407. The drive speed 407 is the desired speed at which to drive the motor 101. According to one embodiment, the drive speed 407 may be one or more predetermined speeds stored in memory 224 of the motor control module 110 that may be chosen by the controller 220 depending on a selected operation. Each stored predetermined speed may comprise a different speed value. For example, the controller 220 may be adopted to control the motor 101 at a first drive speed during normal motor operation to lower or raise the shade material 106, such as from an external control point (e.g., a wall-mounted button panel). According to another embodiment, the controller 220 may be adopted to control the motor 101 at a second drive speed, which may be slower than the first drive speed, during a solar tracking operation. Predetermined speeds may be stored for other operations, such as a predetermined speed for time of day, a predetermined speed for scheduled control event (for example, from an automation control system), a predetermined speed for preselected scene, a predetermined speed for full open or full closed operation, a predetermined speed for incremental control operation, a predetermined speed based on travel distance (e.g., short travel versus long travel), or the like. According to another embodiment, a user may be able to change the drive speed 407 of the motor 101, including the first drive speed, the second drive speed, or any other stored predetermined speed, via the internal user interface 226 or an external user interface. According to another embodiment, the controller 220 or the building automation system may be adapted to dynamically determine the drive speed 407 of the motor 101 according to the solar tracking algorithm that takes into accounts various parameters of the roller shade system, such as the size of the window, the elevation of the window from the floor or sea level, the size of the shade material, the weight of the shade material, the angle of the window with respect to the sun, the point of how far the light should enter the space, the position of the shade material 106 between the upper and the lower limit as determined by position detector 402, or the like.

The speed regulator 404 determines the drive frequency for the motor control signal 211 at which to drive the motor 101 based on the drive speed 407. According to one embodiment, after determining the drive frequency, the speed regulator 404 may be adopted to maintain a constant drive frequency. According to another embodiment, the speed regulator 404 may be adopted to vary the drive frequency to maintain constant speed based on the feedback signal 212 received from the position detector 402. To determine the drive frequency from the drive speed 407, the speed regulator 404 may multiply the drive speed 407 by a factor that takes into account the particular output stage gain of the motor 101 as well as other parameters of the particular motor 101.

The amplitude regulator 409 regulates the amplitude for the motor control signal 211 at which to drive the motor 101. According to an embodiment, the amplitude for the motor control signal 211 may be set to a particular "maximum" amplitude value ($A_{MAX}$) to run the motor 101 at a set power. This maximum amplitude value ($A_{MAX}$) may be preset according to given motor parameters, such as its power rating. Although running a motor 101 at a high amplitude and thereby high or substantially full power during normal operation is inefficient, for solar tracking implementation the motor 101 is driven very slowly and only for a very short period of time. Beneficially, driving the motor 101 at the set maximum amplitude value ($A_{MAX}$) in such applications ensures that the motor 101 will move the shade material 106 since low amplitude values may not be high enough to cause any rotation of the motor 101 during short periods of time.

According to an embodiment, the maximum amplitude value ($A_{MAX}$) can be optimized based on the maximum level of torque anticipated to be driven by the motor 101. In addition, the maximum amplitude value ($A_{MAX}$) can be constantly or periodically altered based on some margin above a previously converged to amplitude. This allows for safer and more efficient operation. According to yet another embodiment, in addition to motor parameters, the maximum amplitude value ($A_{MAX}$) may be preset or adjusted dynamically using external parameters, such as the load exerted on the motor. This allows the amplitude for each phase to be offset down by a value that corresponds to the anticipated load on the system to reduce power consumption and allow more efficient operation. In roller shade applications, the load parameters may include the size of the shade material 106, the weight of the shade material 106, as well as the size and weight of the hem bar 113, or the like. These load parameters may be inputted and stored in memory 224 of the motor control module 110 and can be factored in by the controller 220 to preset the maximum amplitude value ($A_{MAX}$) during setup of the roller shade 100. The set maximum amplitude value ($A_{MAX}$) may be updated from time to time, for example, if the motor control module 110 is reset (e.g., after replacing the shade material 106 and/or the hem bar 113), as a result of firmware update, or the like.

Referring back to FIG. 4, as the rotor 203 of the motor 101 rotates (FIG. 2), at least one position detector 402, such as Hall Effect sensors 206a-c, may determine the position of the rotor 203 in relation to the stator poles 205a-c and outputs a feedback signal 212. The feedback signal block 403 may turn the feedback signal 212 into a sinusoidal wave signal, from which the controller 220 may determine the position of the rotor 203 in relation to the stator poles 205a-c. Using this position, the controller 220 may track the position of the shade material 106 between the upper limit and the lower limit. In addition, using this position, the controller 220 may adjust the frequency and/or the amplitude of the motor control signal 211 to maintain the desired drive speed 407, such as for normal operation.

The output signal generator 405 generates the motor control signal 211 to drive the motor 101 at the frequency set by the speed regulator 404 and the amplitude set by the amplitude regulator 409. The output signal generator 405 may or may not use the feedback signal 212 to generate the motor control signal 211. The power driver 406 uses the motor control signal 211 from the output signal generator 405 to generate current to excite the stator coils to drive the motor 101.

Referring to FIG. 5, there is shown a flowchart 500 that illustrates a method of controlling the motor system for a solar tracking operation, and more particularly the motor control algorithm that generates a motor control signal for each motor phase for a solar tracking operation according to an illustrative embodiment. FIG. 6A illustrates an exemplary motor control signal 600 generated for one of the phases of the motor 101 according to the motor control algorithm in FIG. 5, while FIG. 6B illustrates the changes in frequency of the motor control signal 600. For example, for a three phase motor, three motor sinusoidal waveforms 604 will be generated according to the motor control algorithm in FIG. 5 at 120 degrees out of phase angles. To move the motor 101 very slowly during a very short period of time, the motor control module 110 drives the motor 101 according to a startup sequence during a first time period ($T_1$) 601, a full drive sequence during a second time period ($T_2$) 602, and a wind down sequence during a third time period ($T_3$) 603. During the full drive sequence the motor 101 is driven at a sinusoidal waveform 604 at set maximum amplitude ($A_{MAX}$) 610 and a drive frequency ($F_D$), which may be determine as discussed above. Accordingly, substantially as soon as the motor 101 is ramped up to get the shade material 106 moving, it is then relaxed and engages the clutch 121—stabilizing the system to be ready to start up again. As such, the motor 101 is turned on and turned off pretty quickly and moves pretty slowly and unperceivably. For example, the first time period ($T_1$) may range from about 2 to about 3 seconds, the second time period ($T_2$) may range from about 2 to 3 seconds, and the third time period ($T_3$) may range from about 2 to about 3 seconds. The startup sequence, and similarly the wind down sequence, ensures that the motor 101 remains quiet during operation. If on startup, the motor 101 is instantaneously impulsed with a motor control signal to the maximum amplitude value ($A_{MAX}$) 610, it will likely react with a jolting or clunking sound when the motor rotor 102 locks into a correct position with respect to the stator 107. In order to eliminate this event, a startup sequence is implemented according to the present embodiments to lock the rotor into a known state before starting commutation. This helps to avoid perceivable "clunk" noise on startup.

Referring to FIGS. 5, 6A and 6B, in step 502, the motor control module 110 may receive a control command to move the motor to lower or raise the shade material 106. The control command may be generated by the motor control module 110 based on a solar tracking algorithm. In another embodiment, the control command may be received from an external control point, for example from a control processor of a home automation system that implements the solar tracking algorithm to control one or a plurality of roller shades. The control command may include the drive distance and/or the drive speed at which to move the motor based on the sun's position as discussed above.

Then, in step 504, for each motor phase, the motor control module 110 determines a startup point 611 with a startup amplitude ($A_S$) in the sinusoidal waveform 610 comprising a maximum amplitude ($A_{MAX}$) 610. According to one embodiment, the motor control module 110 may compute a sinusoidal waveform 604 for each phase and estimate the startup point 611 based on previously detected and stored position of the motor. According to another embodiment, the startup point 611 may be directly determined using the position detector, such as by an absolute encoder. In particular, the motor control module 110 may store the last recorded position of the rotor with respect to the stator and use that position to determine the startup point 611 in the sinusoidal waveform 604. Startup point 611 may be defined by a startup angle shift that aligns with a startup amplitude ($A_S$) 612 at startup time 613. For a three phase motor, three startup points may be determined for each of the three waveforms, which may be offset by 120 degrees.

In step 506, the motor control module 110 drives the motor phase according to an amplitude ramping curve 608 until reaching the startup point 613 by increasing the amplitude from an initial amplitude ($A_I$) 609 to the startup amplitude ($A_S$) 612. The initial amplitude ($A_I$) 609 may comprise zero or some other nominal value. The amplitude ramping curve 608 may comprise a linear ramping curve as illustrated in FIG. 6A, or it may comprise a non-linear ramping curve, such as a positive or a negative logarithmic curve. For example, a slower initial ramp may be needed to maintain silent motor operation. The rate of ramp (e.g., slope) of the ramping curve may be relative to the startup amplitude ($A_S$) 612 in relation to the startup time 613. Because each startup point, and thereby each startup amplitude ($A_S$), is different for each phase sinusoidal wave, each ramping curve is also different for its respective phase such that the three phases arrive at their respective startup amplitudes ($A_S$) at the same startup time 613. According to another embodiment, the curve and slope for each phase may be kept constant such that each phase may arrive at its startup point at a different time.

Then in step 510, the motor control module begins to drive each motor phase according to the sinusoidal waveform 604 from the startup point 611 at the maximum amplitude ($A_{MAX}$) 610 (FIG. 6A) and at an initial frequency ($F_I$) 621 (FIG. 6B). The initial frequency ($F_I$) 621 may be zero or a greater nominal value. In step 512, the motor control module 110 then gradually ramps up the frequency of the sinusoidal waveform 604 from the initial frequency ($F_I$) 621 to the drive frequency ($F_D$) 622, for example according to frequency ramping curve 623. The frequency ramping curve 623 may comprise a linear curve as illustrated in FIG. 6B, or it may comprise a non-linear curve, such as a positive or a negative logarithmic curve. The drive frequency ($F_D$) 622 is determined based on the desired speed as discussed above. For example, the motor control module 110 may modulate the frequency starting from 0 Hz up to the drive frequency ($F_D$) 622 based on the desired speed.

Then in step 514, the motor control module 110 drives the motor phase according to the sinusoidal waveform 604 at the maximum amplitude ($A_{MAX}$) and the drive frequency ($F_D$) during the second time period ($T_2$), which corresponding to the time period necessary to move the shade material 106 by a desired distance. Accordingly, during the first time period ($T_1$) 601 the phases of the motor are ramped up to the maximum amplitude ($A_{MAX}$) 610 and to the drive frequency ($F_D$) 622 by energizing the coils and increasing the voltage according to ramping curves 608 and 623. During the second time period ($T_2$), the phases are driven using AC voltage as defined by the sinusoidal waveforms 604. As such, instead of jumping to the maximum amplitude ($A_{MAX}$) 610 and to the drive frequency ($F_D$) immediately, the magnetic field is slowly applied to the rotor to less aggressively lock it into the magnetic field before starting to move the magnetic field. This helps to eliminate noise upon startup.

In step 516, at the completion of the second time period ($T_2$), the motor control module 110 gradually reduces the frequency of the sinusoidal waveform 604 from the drive frequency ($F_D$) 622 to an end frequency ($F_E$) 625, for example according to frequency wind down curve 624. The frequency wind down curve 624 may comprise a linear curve as illustrated in FIG. 6B, or it may comprise a non-linear curve, such as a positive or a negative logarithmic curve. End frequency ($F_E$) 625 can comprise zero.

In step 518, the motor control module 110 determines a wind down point 614 with a wind down amplitude ($A_W$) 615 in the sinusoidal waveform 604 based on the currently detected position of the rotor with respect to the stator of the motor 101, in a similar manner as discussed above in step 504. The wind down point 614 may be defined by a wind down amplitude ($A_W$) 615 at a wind down time 616. In step 520, the motor control module 110 drives the motor phase according to an amplitude relaxing curve 617 with amplitude that decrease from the wind down amplitude ($A_W$) 615 to an end amplitude ($A_E$) 619. The end amplitude ($A_E$) 619 may comprise zero. The amplitude relaxing curve 617 may comprise a linear curve, or it may comprise a non-linear curve, such as a positive or a negative logarithmic curve. The slope of the amplitude relaxing curve 617 may be relative to the wind down amplitude ($A_W$) 615 in relation to the wind down time 616.

INDUSTRIAL APPLICABILITY

The disclosed embodiments provide a system, software, and method for controlling a brushless direct current (BLDC) driven motor for a solar tracking operation in a motorized window treatment. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A motorized shade for selectively covering an architectural opening comprising:
    a roller tube;
    a shade material connected to the roller tube;
    a motor adapted to rotate the roller tube to raise or lower the shade material between an upper limit and a lower limit, wherein the motor comprises a rotor and a stator comprising at least one phase; and
    a controller adapted to control the motor to move the shade material by an incremental distance, wherein for at least one motor phase to move the shade material by the incremental distance the controller is adapted to:
        drive the motor phase according to an amplitude ramping curve comprising amplitude that increases from an initial amplitude to a startup amplitude;

drive the motor phase from the startup amplitude according to a sinusoidal waveform comprising a set maximum amplitude and an initial frequency;

ramp up frequency of the sinusoidal waveform from the initial frequency to the drive frequency; and drive the motor phase according to the sinusoidal waveform at the set maximum amplitude and the drive frequency.

2. The motorized shade of claim 1, wherein controller is adapted to move the shade material at a drive speed, wherein the controller determines the drive frequency based on the drive speed.

3. The motorized shade of claim 2, wherein at least one of the incremental distance and the drive speed is determined based on at least one parameter of the motorized shade or the architectural opening, wherein the at least one parameter of the motorized shade or the architectural opening comprises at least one selected from the group consisting of a size of architectural opening, an elevation of the architectural opening from a floor, an elevation of the architectural opening from sea level, a size of the shade material, a weight of the shade material, a determined angle of the architectural opening with respect to the sun, a distance of how far light should enter a space, a position of the shade material between the upper and the lower limit, and any combinations thereof.

4. The motorized shade of claim 1, wherein for each motor phase the controller is adapted to determine the startup amplitude based on prior recorded position of the rotor with respect to the stator.

5. The motorized shade of claim 4, further comprises at least one position detector adapted to detect the position of the rotor with respect to the stator.

6. The motorized shade of claim 1, wherein the amplitude ramping curve comprises at least one selected from the group consisting of a linear curve, a non-linear curve, a positive logarithmic curve, a negative logarithmic curve, and any combinations thereof.

7. The motorized shade of claim 1, wherein at least one of the initial amplitude and the initial frequency comprises zero, a nominal value, or any combination thereof.

8. The motorized shade of claim 1, wherein the controller ramps up the frequency of the sinusoidal waveform according to a frequency ramping curve.

9. The motorized shade of claim 8, wherein the frequency ramping curve comprises at least one selected from the group consisting of a linear curve, a non-linear curve, a positive logarithmic curve, a negative logarithmic curve, and any combinations thereof.

10. The motorized shade of claim 1, wherein the controller is further adapted to:

reduce the frequency of the sinusoidal waveform from the drive frequency to an end frequency; and drive the motor phase according to an amplitude relaxing curve comprising amplitude that decreases from a wind down amplitude to an end amplitude.

11. The motorized shade of claim 10, wherein for each motor phase the controller is adapted to determine the wind down amplitude based on a then determined current position of the rotor with respect to the stator.

12. The motorized shade of claim 10, wherein the amplitude relaxing curve comprises at least one selected from the group consisting of a linear curve, a non-linear curve, a positive logarithmic curve, a negative logarithmic curve, and any combinations thereof.

13. The motorized shade of claim 10, wherein at least one of the end amplitude and the end frequency comprises zero.

14. The motorized shade of claim 10, wherein the controller reduces the frequency of the sinusoidal waveform according to a frequency wind down curve.

15. The motorized shade of claim 14, wherein the frequency wind down curve comprises at least one selected from the group consisting of a linear curve, a non-linear curve, a positive logarithmic curve, a negative logarithmic curve, and any combinations thereof.

16. The motorized shade of claim 1, wherein the controller is further adapted to determine the startup amplitude based on a previously converged to amplitude of the motor phase.

17. The motorized shade of claim 1, wherein the set maximum amplitude is determined based on at least one selected from the group consisting of a parameter of the motor, a maximum level of torque anticipated to be driven by the motor, a load parameter on the motor of the motorized shade, and any combinations thereof.

18. The motorized shade of claim 17, wherein the load parameter comprises at least one selected from the group consisting of a size of the shade material, a weight of the shade material, a size of a hem bar attached to the shade material, a weight of the hem bar, and any combinations thereof.

19. A motorized shade for selectively covering an architectural opening comprising:

a roller tube;

a shade material connected to the roller tube;

a motor adapted to rotate the roller tube to raise or lower the shade material between an upper limit and a lower limit, wherein the motor comprises a rotor and a stator comprising at least one phase; and a controller adapted to control the motor to move the shade material by an incremental distance, wherein for at least one motor phase to move the shade material by the incremental distance the controller is adapted to:

drive the motor phase according to a startup sequence comprising ramping up amplitude form an initial amplitude to a startup amplitude and ramping up frequency from an initial frequency to a drive frequency;

drive the motor phase according to a full drive sequence comprising driving the motor phase according to a sinusoidal waveform at a set maximum amplitude and at the drive frequency; and drive the motor phase according to a wind down sequence comprising reducing frequency from the drive frequency to an end frequency and reducing the amplitude from the maximum amplitude to an end amplitude.

20. A motorized shade for selectively covering an architectural opening comprising:

a roller tube;

a shade material connected to the roller tube;

a motor adapted to rotate the roller tube to raise or lower the shade material between an upper limit and a lower limit, wherein the motor comprises a rotor and a stator comprising at least one phase; and a controller adapted to move the motor by an incremental time period, wherein for at least one motor phase and during the incremental time period the controller is adapted to:

drive the motor phase according to a startup sequence comprising ramping up amplitude form an initial amplitude to a startup amplitude and ramping up frequency from an initial frequency to a drive frequency;

drive the motor phase according to a full drive sequence comprising driving the motor phase according to a sinusoidal waveform at a set maximum amplitude and at the drive frequency; and drive the motor phase according to a wind down sequence comprising reducing frequency from the drive frequency to an end frequency and reducing the amplitude from the maximum amplitude to an end amplitude.

21. A method for controlling a motor of a motorized shade for moving a shade material of the motorized shade by an incremental distance, wherein the motor comprises a rotor and a stator with at least one phase, wherein for at least one motor phase the method comprises the steps of:

driving the motor phase according to an amplitude ramping curve comprising amplitude that increases from an initial amplitude to a startup amplitude;

driving the motor phase from the startup amplitude according to a sinusoidal waveform comprising a set maximum amplitude and an initial frequency;

ramping up frequency of the sinusoidal waveform from the initial frequency to the drive frequency;

driving the motor phase according to the sinusoidal waveform at the set maximum amplitude and the drive frequency;

reducing the frequency of the sinusoidal waveform from the drive frequency to an end frequency; and driving the motor phase according to an amplitude relaxing curve comprising amplitude that decreases from a wind down amplitude to an end amplitude.

* * * * *